United States Patent [19]

Geschwender

[11] 4,220,346
[45] Sep. 2, 1980

[54] UTILITY CART

[75] Inventor: Robert C. Geschwender, Lincoln, Nebr.

[73] Assignee: Concept Engineering Inc., Lincoln, Nebr.

[21] Appl. No.: 945,858

[22] Filed: Sep. 26, 1978

[51] Int. Cl.² .............................................. B62B 1/04
[52] U.S. Cl. .............................. 280/47.18; 280/47.28; 280/47.34; 280/654
[58] Field of Search ............... 280/47.17, 47.18, 47.19, 280/47.24, 47.26, 47.27, 47.28, 47.29, 652, 659, 47.33, 47.34, 47.35, 654; 414/446, 444, 457

[56] References Cited

U.S. PATENT DOCUMENTS

| | | | |
|---|---|---|---|
| 1,165,954 | 12/1915 | Edmonds | 280/47.29 X |
| 2,372,372 | 3/1945 | Faure | 280/47.33 X |
| 2,775,465 | 12/1956 | Swingler | 280/47.33 X |
| 2,784,004 | 3/1957 | Hamrick | 280/30 |
| 3,052,484 | 9/1962 | Huffman et al. | 280/47.19 X |
| 3,540,614 | 11/1970 | Flagg | 280/47.34 X |
| 3,782,752 | 4/1974 | Gobetz | 280/47.19 |
| 3,845,968 | 11/1974 | Larson | 280/47.24 |
| 4,009,891 | 3/1977 | Jenson | 280/651 |

FOREIGN PATENT DOCUMENTS

| | | | |
|---|---|---|---|
| 1502988 | 10/1967 | France | 280/47.18 |
| 1079772 | 8/1967 | United Kingdom | 280/47.34 |
| 1110542 | 4/1968 | United Kingdom | 280/47.34 |

*Primary Examiner*—John J. Love
*Assistant Examiner*—D. W. Underwood
*Attorney, Agent, or Firm*—Senninger, Powers, Leavitt and Roedel

[57] ABSTRACT

A utility cart comprising an upwardly extending frame, a pair of wheels journaled on the lower end of the frame at opposite sides of the frame, and a bed pivoted adjacent one of its ends on the frame at the lower end of the frame for swinging about an axis extending from side-to-side of the frame between an extended position in which the bed extends forwardly from the frame in a generally horizontal direction and an upright position in which the bed extends upwardly alongside the frame at the front of the frame. The bed has a support at one end extending forwardly from the bed when the bed is in its upright position for supporting an object to be carried on the cart. Legs at the other end of the bed support the bed in its extended position. The bed can be selectively locked to the frame in its extended and upright positions.

30 Claims, 10 Drawing Figures

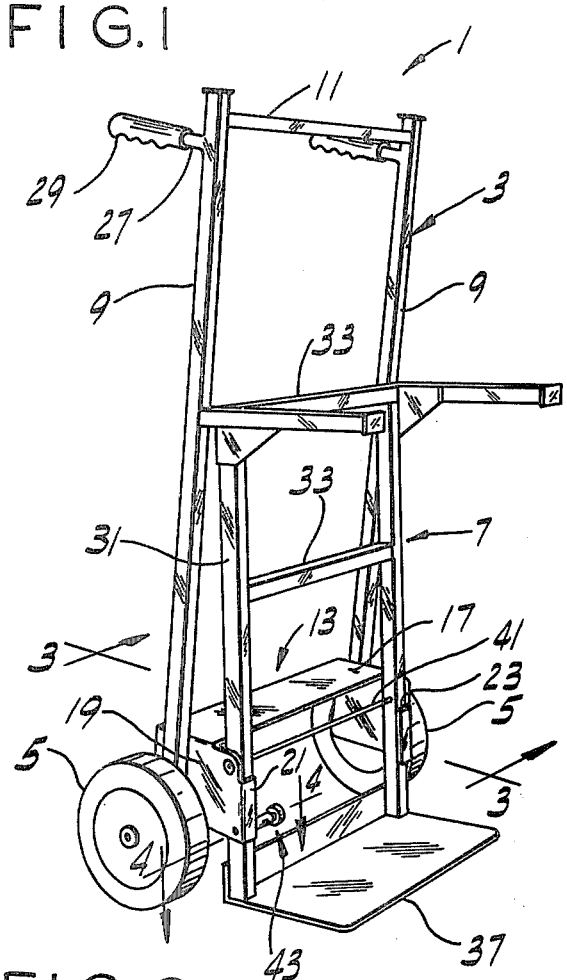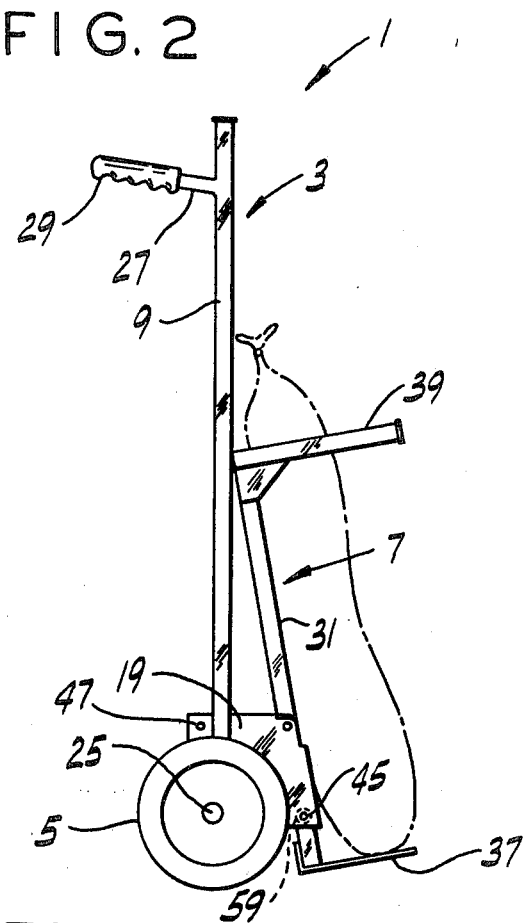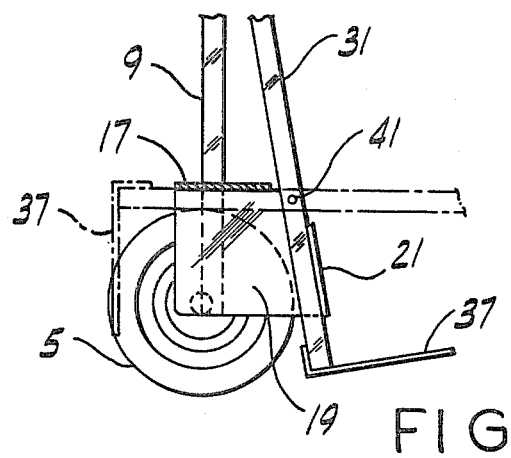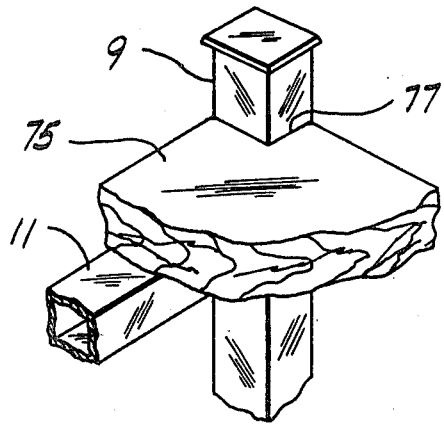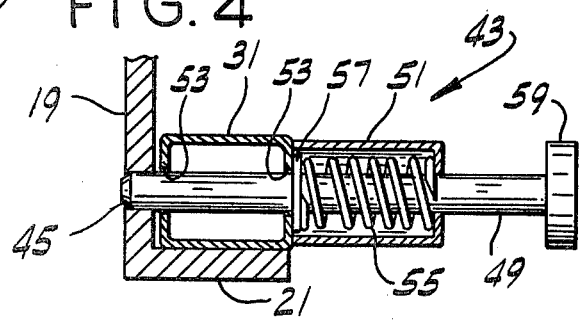

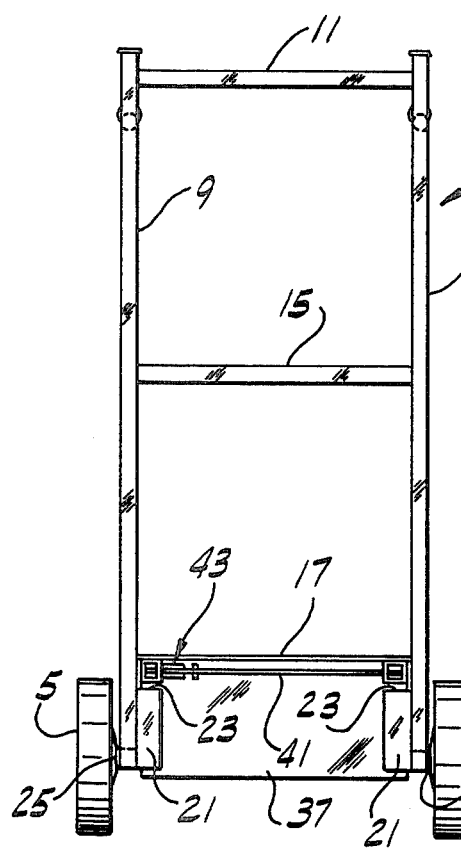
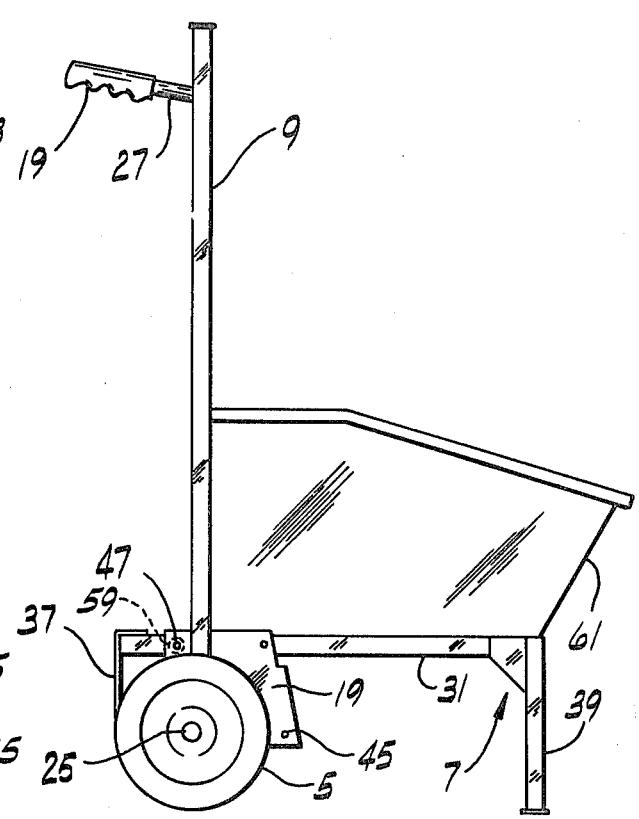
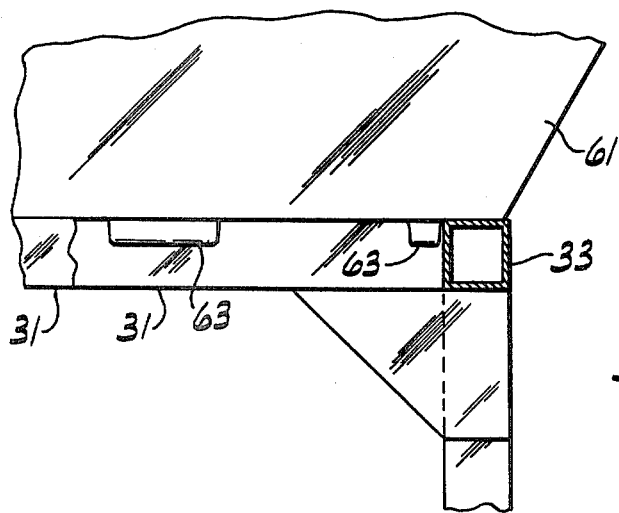
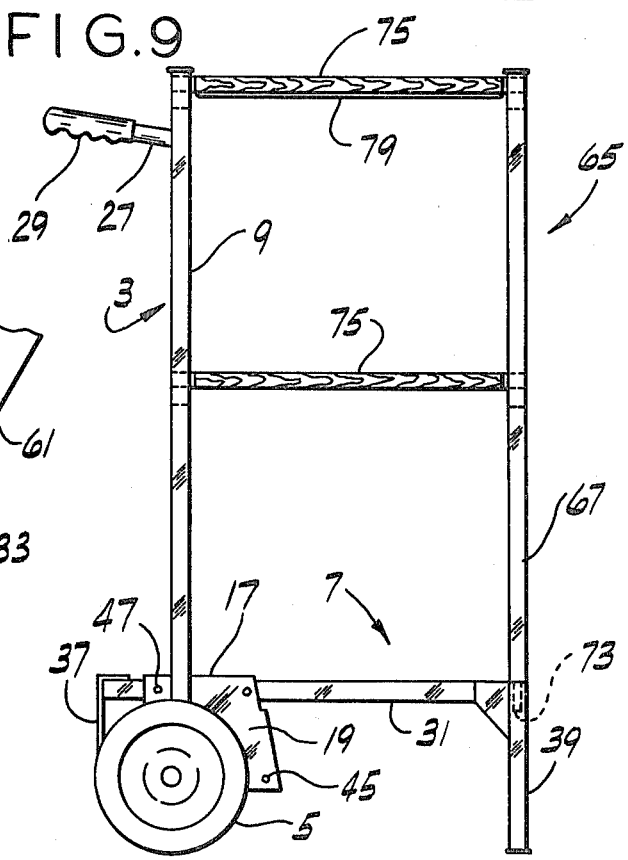

UTILITY CART

BACKGROUND OF THE INVENTION

This invention relates generally to a hand-propelled vehicle and more particularly to a multipurpose utility cart which in one mode functions as a conventional two-wheel dolly for transporting loads relatively small in size and in another mode as a flat-bed cart for transport and storage of larger loads. Reference may be made to U.S. Pat. Nos. 4,009,891 and 2,784,004 for vehicles generally in the field of this invention.

SUMMARY OF THE INVENTION

Among the several objects of this invention may be noted the provision of an improved utility cart of the type described above which is readily convertible from one mode to another and which may be selectively locked in either mode; the provision of such a cart which has a multitude of uses, being adapted to function, for example, as a conventional two-wheel dolly, a flat-bed cart, a wheelbarrow, a serving cart, a scaffolding, a refuse bag support and a sawhorse; the provision of such a cart which is easily maneuverable; and the provision of such a cart which is simple, economical and durable in construction.

Generally, a utility cart of this invention comprises an upwardly extending frame, a pair of wheels journaled on the lower end of the frame at opposite sides of the frame for rotation about an axis extending transversely of the frame, and a bed pivoted toward one of its ends on the frame at the lower end of the frame for swinging about an axis generally parallel to the axis of rotation of the wheels between an extended position in which the bed extends generally perpendicularly from the frame in a generally horizontal direction constituting the forward direction, and an upright position in which the bed extends upwardly alongside the frame. The cart further comprises support means at said one end of the bed adapted to extend forwardly from the bed when the bed is in its upright position for supporting an object to be carried on the cart. Legs at the other end of the bed support the bed in its extended position and extend forwardly from the bed when the latter is in its upright position. Means are provided for selectively locking the bed to the frame in its extended and upright positions.

Other objects and features will be in part apparent and in part pointed out hereinafter.

BRIEF DESCRIPTION OF THE DRAWINGS

FIG. 1 is a perspective of a cart of this invention in one mode in which it functions as a two-wheel dolly;

FIG. 2 is a side elevation of the cart shown in FIG. 1;

FIG. 3 is a section taken on line 3—3 of FIG. 1;

FIG. 4 is an enlarged section taken on line 4—4 of FIG. 1 showing a detent assembly of this invention;

FIG. 6 is a section taken on line 6—6 of FIG. 5;

FIG. 7 is a side elevation of the cart in its extended mode with the upright removed, illustrating the use of the cart as a wheelbarrow;

FIG. 8 is an enlarged portion of FIG. 7 with portions broken away to illustrate details;

FIG. 9 is a side elevation of the cart in its extended mode with the upright attached, illustrating the use of shelves with the cart for enabling the cart to be used, for example, as a serving cart; and FIG. 10 is an enlarged perspective illustrating how the shelves interfit with the cart.

Corresponding reference characters indicate corresponding parts throughout the several views of the drawings.

DESCRIPTION OF THE PREFERRED EMBODIMENT

Figure 5:
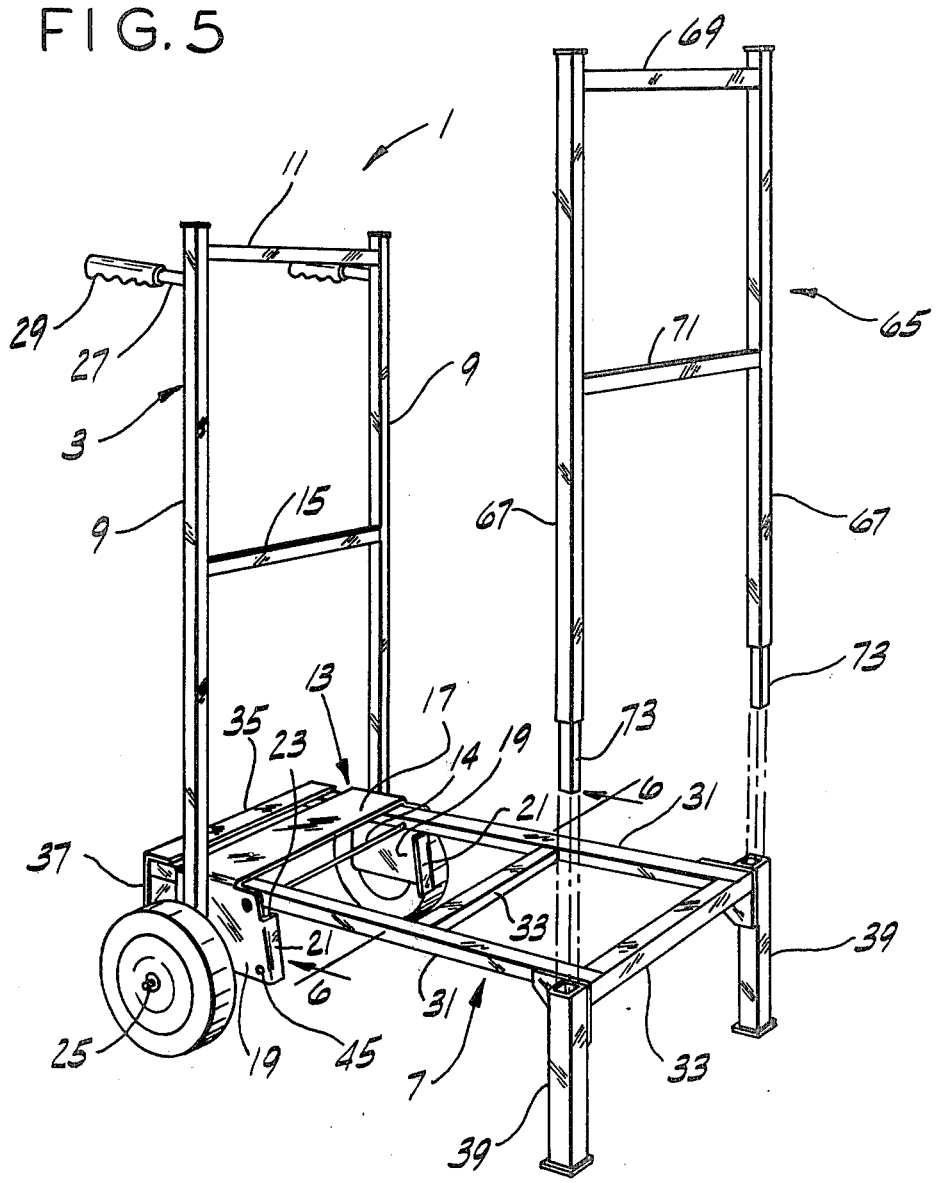
FIG. 5 is a perspective depicting the cart in a second extended mode in which it functions as a flat-bed cart, and illustrating how an upright is attached to the cart.

Referring now to the drawings, particularly to FIGS. 1 and 2, a utility cart of this invention is designated in its entirety by the reference numeral 1 and is shown to comprise a generally rectangular, upwardly extending frame 3. Two wheels, each designated 5, are journaled on the lower end of the frame at opposite sides of the frame for rotation about an axis extending transversely of the frame. Indicated generally at 7 is a rectangular framework constituting a bed pivoted adjacent one of its ends on the frame at the lower end of the frame for swinging about an axis generally parallel to but spaced forward (to the right as viewed in FIGS. 1 and 2) and above the axis of rotation of the wheels. The bed is swingable between an upright position (FIG. 1) in which the bed extends upwardly alongside the frame and an extended or unfolded position (FIG. 5) in which the bed extends generally perpendicularly forwardly from the frame in a genrally horizontal direction.

More particularly, frame 3 comprises a pair of vertical spaced-apart side frame members 9 of tubular bar stock of rectangular cross-section. These frame members 9 are connected at their upper ends by an upper cross frame member 11, also of tubular bar stock having a rectangular cross-section, and at their lower ends by a lower cross frame member generally designated 13. A third cross frame member 15, identical in size and shape to upper cross frame member 11, extends between the side frame members intermediate the upper and lower cross frame members 11, 13. As shown, lower cross frame member 13 has a cross plate portion 17 spanning the side frame members 9 and a pair of support plate portions, each designated 19, bent down from opposite ends of the cross plate portion on the inside of the side frame members and secured, as by welding, to the latter. These support plate portions 19 project forwardly (to the right as viewed in FIG. 1) in parallel vertical planes from the frame at the front of the frame and, as indicated at 21, have front margins bent inwardly toward each other, the upper portion of each margin being removed to provide a shoulder 23. The wheels of the cart are pinned at 25 to the support plate portions 19 for rotation. Extending rearwardly from the upper end of each side frame member 9 is a handlebar 27 for facilitating maneuvering of the cart as it is rolled along the ground. Grips 29 are provided on the outer ends of the handlebars.

As shown best in FIG. 5 in which it is illustrated in its extended position, the bed 7 comprises a pair of parallel rails 31 extending longitudinally of the bed at opposite sides of the bed and cross bars 33 extending transversely of the bed between the rails at the middle and front (right) end of the bed, rails 31 and cross bars 33 being tubular members of rectangular cross-section. A plate 35 extends between the rails 31 at the back (left) end of the bed, and a toe piece 37 is bent down from plate 35 on the underside of the bed. Legs 39, also of tubular bar stock of rectangular cross-section, are rigidly secured as by welding to rails 31 at the front end of the bed and support the bed in its extended position. The upper ends of these legs 39 are flush with the top of rails 31 which comprise the upper surface of the bed, thereby providing a flat and unobstructed bed surface extending outwardly (to the right) from the frame 3. The bed is swingable between its extended and upright positions on a rod 41 extending between the upper front corners of support plate portions 19 and through rails 31 adjacent the back end of the bed. The arrangement is such that when the bed is in its extended position, the horizontally disposed rails 31 of the bed engage the underside of cross plate portion 17 of the lower cross frame member 13 and are spaced slightly above shoulders 23 of inturned margins 21 of support plate portions 19, and when the bed is swung up to an upright position, rails 31 engage the inturned margins 21 along the length of the margins (see FIG. 4). In this latter (upright) position, the toe piece 37 of plate 35 extends forwardly at the lower end of the bed and constitutes means for supporting an object to be carried on the cart. The legs 39 at the upper end of the bed also extend forwardly when the bed is upright to assist in holding an object on the cart, as illustrated in FIG. 2.

It will be apparent, therefore, that when the bed 7 is in its upright position, the utility cart 1 functions as a conventional two-wheel dolly for carrying loads. And when the bed is in its extended or unfolded position, the cart serves as a flat-bed cart for transporting or storing loads of larger size. It will, of course, be understood that in order to roll the cart when the bed is in its extended position, the upper end of the frame 3 must first be tilted back to raise the legs 39 off the ground.

A detent assembly generally indicated at 43 constitutes means for selectively locking the bed in its upright and extended positions. More specifically, this assembly comprises a pair of opening 45, 47 in support plate portion 19 of lower cross frame member 13, one of the openings 45 being in the lower front section of support plate portion 19 and the other opening 47 being in the upper back section of support plate 19 (FIG. 7). The detent assembly 43 also includes a detent pin 49 mounted in a sleeve 51 rigidly secured (e.g., welded) to the bed 7 on the inside of rail 31, the pin being movable in the sleeve through holes 53 in the rail from a locking position in which it is received in one of the openings 45, 47 in support plate portion 19 (FIG. 4) and a retracted position (not shown) in which the pin is removed from the opening allowing the bed to be swung about rod 41. A coil spring 55 around the pin and reacting from one end of the sleeve 51 against a flange 57 on the pin biases the pin toward its locking position. This flange 57 is engageable with rail 31 for limiting movement of the pin to the left (as viewed in FIG. 4) in the sleeve. A large annular head 59 at one end of the pin serves as a knob for pulling the pin from its locking to its retracted position.

As shown in FIG. 7, a box-shaped container 61 is adapted to rest atop the bed 7 when the later is in its extended position for enabling a utility cart of this invention to be used as a wheelbarrow. Container 61 is relatively large in size, extending substantially from one side of the bed to the other and from the frame 3 substantially to the outer end of the bed, for holding a relatively large quantity of material. Bosses 63 project down from the bottom of the container and are engageable with rails 31, cross bars 33 and plate 35 for maintaining the container on the bed.

In accordance with this invention, utility cart 1 also optionally includes an upright, generally designated 65, which may be removably attached to the bed at the outer end thereof when the bed is in its extended mode (FIG. 5). This upright, which is approximately of the same width as frame 3, extends outwardly from the bed generally parallel to the frame and comprises a pair of vertical tubular posts 67 of rectangular cross section connected at their upper ends by an upper cross piece 69 which is also a tubular member of rectangular cross-section. A second cross piece 71, identical in size and shape to cross piece 69, spans posts 67 below upper cross piece 69. The lower ends of the posts 67 are reduced in size, as indicated at 73, and the upper ends of the tubular legs 39 at the sides of the bed are dimensioned to provide sockets for slidably receiving the lower ends of the posts 67 thereby removably to attach the upright to the bed.

When upright 65 is attached to the cart, the spacing between the bed 7 and the lower cross piece 71 of the upright is approximately equal to that of intermediate cross frame member 15 of frame 3 above the bed. Moreover, the spacing between the upper and lower cross pieces 69, 71 of the upright is about the same as that between the upper and intermediate cross frame members 11, 15 of the frame. This enables shelves, such as indicated at 75 in FIGS. 9 and 10, to be positioned above the bed generally parallel with the bed, thus increasing still further the number of different ways in which a cart of this invention may be used. For example, with shelves 75 extending between frame 3 and upright 65 and resting on cross frame members 11, 15 of the frame and cross pieces 69, 71 of the upright, the cart may be used for storage purposes, as a serving cart or even as a scaffolding. In this regard, it will be noted that the upper cross frame member 11 of the frame located below but adjacent to the upper ends of side frame members 9 and that the latter are free of interconnection above the upper cross frame member 11. Similarly, the upper cross piece 69 of the upright is located below but adjacent to the upper ends of posts 67, the latter being free of interconnection to one another above upper cross piece 69. This construction enables the upper shelf 75 to be lifted vertically and without obstruction above the upper ends of the posts for quick and easy removal of the shelf from the cart. The corners of each shelf are notched out as indicated at 77 to interfit with side frame members 9 and posts 67, thus ensuring the shelves are securely held on the cart and cannot slide off. It will be observed in FIG. 9 that the upper ends of the side frame members 9 and posts 67 are spaced above upper cross frame member 11 and upper cross piece 69 a distance not substantially greater than the thickness of the upper shelf 75. This provides a substantially unobstructed access to the shelf surface from all directions. One of the shelves (the upper shelf as shown in the drawings) has a rubber pad 79 secured to one face thereof. In the event the cart is used as a scaffolding, this shelf should be positioned on the cart so that the pad faces up to provide a non-slip surface for one standing on the shelf.

Although not illustrated in the drawings, it will be understood that utility cart 1 may also be used to support a refuse or trash bag. More specifically, the height and width of frame 3 and upright 65 and the spacing therebetween are such that a standard-size disposable plastic trash bag may be placed between the frame and upright on the bed and the outer margins of the bag walls at the mouth of the bag folded over the frame and upright to hold the bag up and open for receiving trash or the like.

The cart may also be used as a sawhorse with the lumber to be cut extending between the frame and upright and resting on cross frame member 15 and cross piece 71.

In view of the above, it will be seen that the several objects of the invention are achieved and other advantageous results attained.

As various changes could be made in the above products without departing from the scope of the invention, it is intended that all matter contained in the above description or shown in the accompanying drawings shall be interpreted as illustrative and not in a limiting sense.

What is claimed is:

1. A utility cart comprising: an upwardly extending frame;

a pair of wheels journaled on the lower end of the frame at opposite sides of the frame for rotation about an axis extending transversely of the frame;

a bed pivoted adjacent one of its ends on the frame at the lower end of the frame for swinging about an axis generally parallel to the axis of rotation of the wheels between an extended position in which the bed extends generally perpendicularly from the frame in a generally horizontal direction constituting the forward direction, and an upright position in which the bed extends upwardly alongside the frame; support means at said one end of the bed adapted to extend downwardly from the bed when the latter is in its extended position and forwardly from the bed when the latter is in its upright position for supporting an object to be carried on the cart;

legs at the other end of the bed for supporting the bed in its extended position; and means for locking the bed to the frame in its upright position.

2. A utility cart as set forth in claim 1 wherein the axis about which the bed swings is spaced above and forwardly of the axis of rotation of the wheels.

3. A utility cart as set forth in claim 1 wherein said locking means comprises a detent assembly for selectively locking the bed in its extended and upright positions.

4. A utility cart as set forth in claim 3 wherein said detent assembly comprises a pair of openings in the frame and a detent pin on the bed receivable in either of the openings, the detent pin being receivable in one opening for locking the bed in its extended position and in the other opening for locking the bed in its upright position.

5. A utility cart as set forth in claim 4 wherein said detent pin is spring biased into the openings.

6. A utillity cart as set forth in claim 1 wherein the frame comprises a pair of parallel spaced-apart side frame members connected at their upper ends by an upper cross frame member and having a pair of support plates at their lower ends extending in parallel vertical planes forwardly from the side frame members, the bed being pivoted on the support plates for swinging between the plates between said extended and upright positions.

7. A utility cart comprising:
an upwardly extending frame;

a pair of wheels journaled on the lower end of the frame at opposite sides of the frame for rotation about an axis extending transversely of the frame;

a bed pivoted adjacent one of its ends on the frame at the lower end of the frame for swinging about an axis generally parallel to the axis of rotation of the wheels between an extended position in which the bed extends generally perpendicularly from the frame in a generally horizontal direction constituting the forward direction, and an upright position in which the bed extends upwardly alongside the frame;

support means at said one end of the bed adapted to extend forwardly from the bed when the later is in its upright position for supporting an object to be carried on the cart;

legs at the other end of the bed for supporting the bed in its extended position and adapted to extend forwardly from the bed when the bed is in its upright position; and means for selectively locking the bed to the frame in its extended and upright positions, said frame comprising a pair of parallel spaced-apart side frame members connected at their upper ends by an upper cross frame member and having a pair of support plates at their lower ends extending in parallel vertical planes forwardly from the side frame members, the front margins of said support plates being bent inwardly toward each other, the bed being pivoted on the support plates for swinging between the plates between said extended and upright positions, the bed being engageable with said margins along the length thereof when the bed is in its upright position.

8. A utility cart comprising:
an upwardly extending frame;

a pair of wheels journaled on the lower end of the frame at opposite sides of the frame for rotation about an axis extending transversely of the frame;

a bed pivoted adjacent one of its ends on the frame at the lower end of the frame for swinging about an axis generally parallel to the axis of rotation of the wheels between an extended position in which the bed extend genrally perpendicularly from the frame in a generally horizontal direction constituting the forward direction, and an upright position in which the bed extends upwardly alongside the frame;

support means at said one end of the bed adapted to extend forwardly from the bed when the later is in its upright position for supporting an object to be carried on the cart;

legs at the other end of the bed for supporting the bed in its extended position and adapted to extend forwardly from the bed when the bed is in its upright position; and means for selectively locking the bed to the frame in its extended and upright positions;

the frame comprising a pair of parallel spaced-apart side frame members connected at their upper ends by an upper cross frame member and having a pair of support plates at their lower ends extending in parallel vertical planes forwardly from the side frame members, the bed being pivoted on the support plates for swinging between the plates between said extended and upright positions, said support plates being connected at their upper ends by a lower cross frame member extending between said side frame members, the back end of the bed being engageable with the bottom of the lower cross frame member when the bed is in its extended position.

9. A utility cart as set forth in claim 6 wherein said locking means comprising a detent assembly for locking the bed in its extended and upright position, said assembly comprising a pair of openings in one of said support plates and a detent pin on the bed receivable in the openings for selectively locking the bed in its extended and upright position.

10. A utility cart as set forth in claim 1 further comprising a container adapted to rest on the bed when the bed is in its extended position.

11. A utility cart as set forth in claim 10 wherein said bed comprises a generally rectangular framework and said container is box-shaped and dimensioned for extending substantially from one side of the bed to the other and substantially from the frame to the front of the bed, said container having means thereon engageable with the bed for maintaining the container on the bed.

12. A utility cart as set forth in claim 1 wherein said cart further comprises an upright adapted to be removably attached to the bed at said other end thereof when the bed is in its extended position and to extend upwardly from the bed generally parallel to the frame.

13. A utility cart as set forth in claim 12 wherein the upright and the frame are of the same width.

14. A utility cart as set forth in claim 12 wherein the frame comprises a pair of parallel spaced-apart side frame members connected at their upper ends by an upper cross frame member, said bed comprises a generally rectangular framework, and said upright comprises a pair of parallel posts extending vertically upwardly from the bed and connected at their upper ends by an upper crosspiece, the upper cross frame member of the frame and the upper crosspiece of the upright being spaced approximately the same distance above the bed.

15. A utility cart as set forth in claim 14 further comprising a shelf adapted to extend generally horizontally between the frame and the upright and to rest on said upper cross frame member and crosspiece generally parallel to the bed.

16. A utility cart as set forth in claim 15 wherein the upper cross frame member of the frame is spaced below the upper ends of the side frame members and the upper crosspiece of the upright is spaced below the upper ends of the posts.

17. A utility cart as set forth in claim 14 wherein the lower ends of the posts of the upright are receivable in sockets on the bed removably to attach the upright to the bed.

18. A utility cart as set forth in claim 17 wherein said legs at said other end of the bed are tubular, the upper ends of the legs constituting said sockets for receiving said posts.

19. A utility cart as set forth in claim 14 wherein the frame further comprises a second cross frame member extending between the side frame members below the upper cross frame member and above the bed, and said upright further conmprises a second crosspiece extending between the posts below the upper crosspiece and above the bed, the spacing between the cross frame members of the frame being approximately equal to the spacing between the crosspieces of the upright.

20. A utility cart as set forth in claim 19 further comprising a shelf adapted to rest on said second cross frame member and said second crosspiece and to extend above the bed generally parallel thereto.

21. A utility cart comprising an upwardly extending frame, a pair of wheels journalled on the lower end of the frame for rotation about an axis extending generally transversely of the frame, a bed mounted adjacent one of its ends constituting its inner end on the frame at the lower end of the frame and extending generally perpendicularly outwardly from the frame, tubular legs at the outer end of the bed for supporting the bed, an upright removable attached to the bed at the outer end of the bed and extending upwardly from the bed generally parallel to the frame, said frame comprising a pair of spaced-apart side frame members connected by a cross frame member spaced below but adjacent to the upper ends of the side frame members, said upright comprising a pair of parallel posts extending upwardly from the bed and connected by a crosspiece spaced below but adjacent to the upper ends of said posts, the cross frame member of the frame and the crosspiece of the upright being spaced approximately the same distance above the bed, and a shelf adapted to extend between the frame and the upright and to rest on said cross frame member and crosspiece generally parallel to the bed, said shelf being liftably removable from the cart and formed for interfitting with the frame and upright thereby to maintain it in place on the cart, said legs being open at their upper ends thereby constituting sockets for receiving therein the lower ends of the posts of the upright removably to attach the upright to the bed.

22. A utility cart as set forth in claim 21 wherein each post terminates in an upper end spaced above but adjacent to said crosspiece, said posts being free of interconnection above said crosspiece for enabling the shelf to be lifted vertically and without obstruction above the upper ends of the posts for removal of the shelf from the cart.

23. A utility cart as set forth in claim 22 wherein the shelf has notches therein, the side frame members and the posts of the upright being receivable in said notches for maintaining the shelf in place on the cart.

24. A utility cart as set forth in claim 21 wherein the upper ends of said posts are spaced above said crosspiece a distance not substantially greater than the thickness of said shelf.

25. A utility cart as set forth in claim 21 wherein the upper ends of said legs at the outer end of the bed are flush with the upper surface of the bed thereby providing a flat and unobstructed bed surface extending outwardly from said frame when the upright is removed.

26. A utility cart as set forth in claim 21 wherein the frame further includes a second cross frame member extending between the side frame members below the upper cross frame member and above the bed, and said upright further includes a second crosspiece extending between the posts below the upper crosspiece and above the bed, the spacing between the cross frame members of the frame being approximately equal to the spacing between the crosspieces of the upright.

27. A utility cart as set forth in claim 26 further comprising a second shelf adapted to rest on said second cross frame member and said second crosspiece and to extend above the bed generally parallel thereto.

28. A utility cart as set forth in claim 27 wherein said second shelf is removable from the cart and formed for interfitting with said frame and upright thereby to maintain it in place on the cart.

29. A utility cart as set forth in claim 1 wherein the legs are further adapted to extend forwardly from the bed when the bed is in its upright position.

30. A utility cart as set forth in claim 1 wherein said locking means is further adapted selectively to lock the bed to the frame when the bed is in its extended position as well as when it is in its upright position.

* * * * *